United States Patent
Wang et al.

(10) Patent No.: US 12,475,175 B1
(45) Date of Patent: Nov. 18, 2025

(54) ROBUST DOCUMENTATION UNDERSTANDING USING LARGE LANGUAGE MODEL KNOWLEDGE DISTILLATION AND JOINT TRAINING

(71) Applicant: SAP SE, Walldorf (DE)

(72) Inventors: Weishi Wang, Singapore (SG); Shaun Tieon, Singapore (SG); Yu Sheng Daniel Lee, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/981,884

(22) Filed: Dec. 16, 2024

(51) Int. Cl.
*G06F 16/93* (2019.01)
*G06N 3/0475* (2023.01)
*G06N 3/096* (2023.01)

(52) U.S. Cl.
CPC ........... *G06F 16/93* (2019.01); *G06N 3/0475* (2023.01); *G06N 3/096* (2023.01)

(58) Field of Classification Search
CPC ....... G06F 16/93; G06N 3/096; G06N 3/0475
See application file for complete search history.

(56) References Cited

U.S. PATENT DOCUMENTS

2025/0181923 A1* 6/2025 Valluru .................. G06N 3/084

* cited by examiner

*Primary Examiner* — Hau H Hoang
(74) *Attorney, Agent, or Firm* — Fish & Richardson P.C.

(57) ABSTRACT

Methods, systems, and computer-readable storage media directed to a machine learning (ML) model training system for training ML models by leveraging a large language model (LLM) for knowledge distillation to provide training data and using multi-task learning to train ML models using the training data.

20 Claims, 5 Drawing Sheets

ROBUST DOCUMENTATION UNDERSTANDING USING LARGE LANGUAGE MODEL KNOWLEDGE DISTILLATION AND JOINT TRAINING

BACKGROUND

Entities, such as commercial enterprises, use software systems to conduct operations. Example software systems can include, without limitation, enterprise resource management (ERP) systems, customer relationship management (CRM) systems, human capital management (HCM) systems, and the like. Enterprises continuously seek to improve and gain efficiencies in their operations. To this end, enterprises integrate systems in the domain of so-called intelligent enterprise, which can employ artificial intelligence (AI) that can include, for example, machine learning (ML) models. For example, AI can be used for data analytics and/or automating tasks in support of enterprise operations. AI, however, presents technical hurdles and risks that need to be mitigated in use by enterprises.

SUMMARY

Implementations of the present disclosure are directed to a machine learning (ML) model training system for training ML models. More particularly, the training system of the present disclosure leverages a large language model (LLM) for knowledge distillation to provide training data and uses multi-task learning to train ML models using the training data.

In some implementations, actions include processing a set of documents using a pretrained ML model to selectively use a LLM to generate summaries for documents in the set of documents, training a generative ML model through a multi-task training using training data including the summaries, the multi-task training including, for each sample of the training data, executing the generative ML model to provide a predicted summary and a predicted class, predicted summaries and predicted classes being used to determine a total loss that is minimized across iterations of the multi-task training, training the generative ML model through a retrieval-augmented generation (RAG) training using the training data, the RAG training including, for each sample of the training data, determining a historical document as a most similar document to a respective sample of the training data from a set of historical documents, providing an augmented input based on the respective sample and the historical document, and executing the generative ML model to provide a generated summary and class in response to the augmented input, generated summaries and classes being used to determine a loss that is minimized across iterations of the RAG training, and, after training, using the generative ML model with an enterprise system. Other implementations of this aspect include corresponding systems, apparatus, and computer programs, configured to perform the actions of the methods, encoded on computer storage devices.

These and other implementations can each optionally include one or more of the following features: processing a set of documents using a pretrained ML model to selectively use a LLM to generate summaries for documents in the set of documents includes prompting the LLM to generate a summary based on a document in the set of documents, processing the summary through the pretrained model to predict a class, and in response to the class matching an expected class, associating the summary with the document in the training data; actions further include determining a set of similarity scores, each similarity score representing a degree of similarity between the respective sample of the training data and a respective historical document, each similarity score comprising a lexical similarity score and a semantic similarity score; the lexical similarity score is determined using a best matching (BM) retriever and the semantic similarity score is determined using a dense passage retrieval (DPR) retriever; determining a historical document as a most similar document to a respective sample of the training data from a set of historical documents is at least partially executed using a retriever that is trained during the RAG training; at starting the RAG training, the retriever is initialized as an encoder of the generative ML model, the encoder being trained during the multi-task training; and actions further include, for each document in the set of documents, preprocessing the document to provided extracted information, the extracted information being used for the multi-task training and the RAG training.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
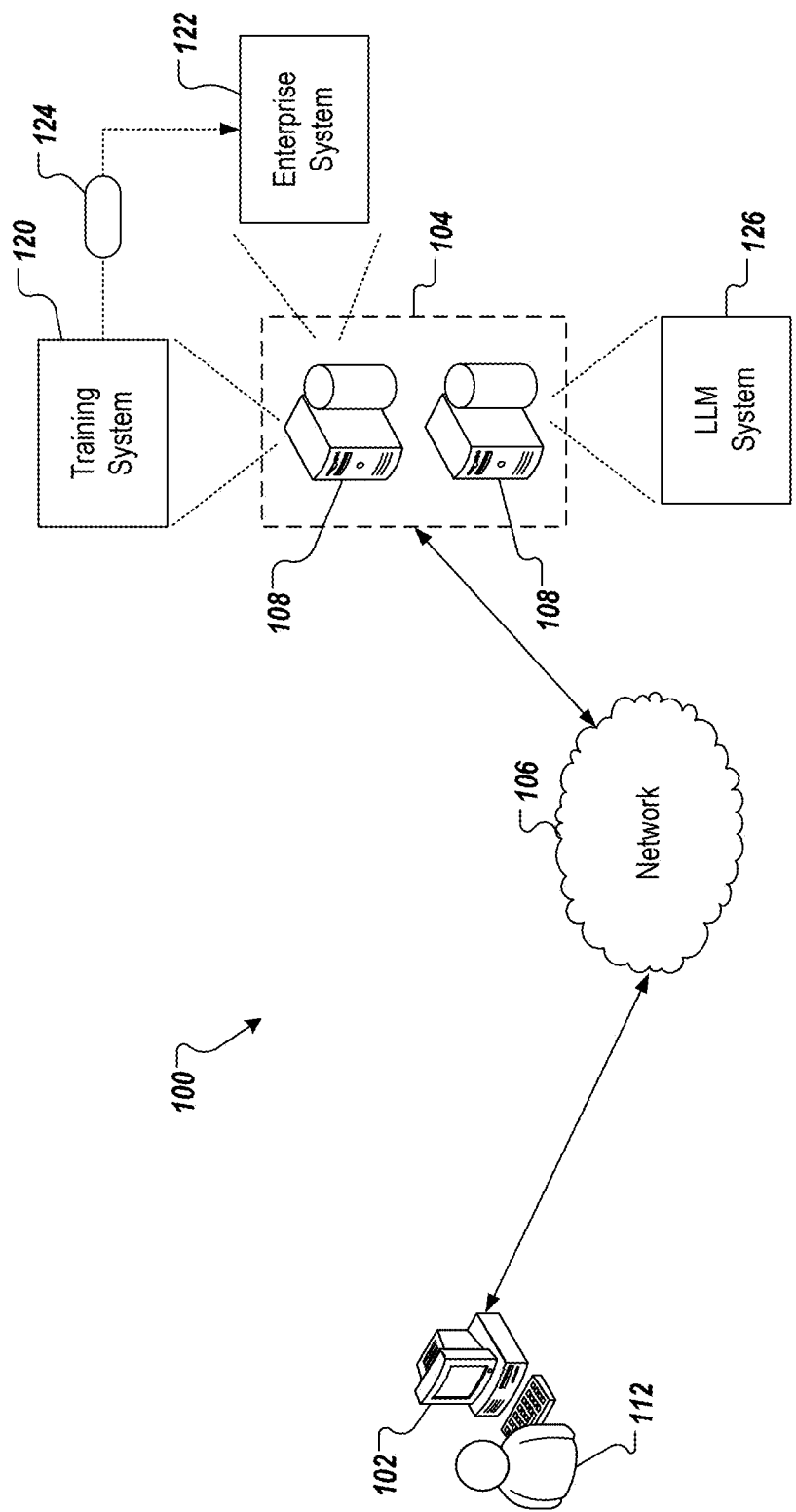
FIG. 1 depicts an example architecture that can be used to execute implementations of the present disclosure.

Implementations of the present disclosure are directed to a machine learning (ML) model training system for training ML models. More particularly, the training system of the present disclosure leverages a large language model (LLM) for knowledge distillation to provide training data and uses multi-task learning to train ML models using the training data.

Implementations can include actions of processing a set of documents using a pretrained ML model to selectively use a LLM to generate summaries for documents in the set of documents, training a generative ML model through a multi-task training using training data including the summaries, the multi-task training including, for each sample of the training data, executing the generative ML model to provide a predicted summary and a predicted class, predicted summaries and predicted classes being used to determine a total loss that is minimized across iterations of the multi-task training, training the generative ML model through a retrieval-augmented generation (RAG) training using the training data, the RAG training including, for each sample of the training data, determining a historical document as a most similar document to a respective sample of the training data from a set of historical documents, providing an augmented input based on the respective sample and the historical document, and executing the generative ML model to provide a generated summary and class in response to the augmented input, generated summaries and classes being used to determine a loss that is minimized across iterations of the RAG training, and, after training, using the generative ML model with an enterprise system.

Implementations of the present disclosure are described in further detail herein with reference to an example enterprise system, which includes an expense management system. It is contemplated, however, that implementations of the present disclosure can be realized with any appropriate enterprise system.

To provide further context for implementations of the present disclosure, and as introduced above, enterprises integrate systems in the domain of so-called intelligent enterprise, which can employ artificial intelligence (AI) that can include, for example, ML models. For example, AI can be used for data analytics and/or automating tasks in support of enterprise operations. More particularly, AI can be integrated to automate tasks of workflows to improve efficiencies in execution of enterprise operations. AI, however, presents technical hurdles and risks that need to be mitigated in use by enterprises.

For example, and with reference to the example enterprise system, enterprises can rely on an expense management system (e.g., as part of an ERP system) to analyze, monitor, and control travel and other reimbursable expenses, while maintaining accuracy and increasing worker productivity. The expense management system can enable employees to prepare and submit expense reports and can include automation tools, such as ML models that enable employees to spend less time creating and monitoring expense reports. However, automation tools, such as ML models, can present technical challenges that, if not handled, can introduce inaccuracies and result in technical inefficiencies.

More particularly, ML models are limited to prior knowledge represented in training data, which can result in inaccuracies in outputs that can inhibit execution of workflows and/or create downstream errors, and the like, resulting in an unreliable solution. For example, in the event the enterprise system is introduced to unforeseen scenarios and/or use cases, errors arise and suboptimal performance of the enterprise system results. This also leads to inefficiencies including technical inefficiencies in expending technical resources to correct errors and bring workflows back online. As such, the integration of AI into enterprise systems results in technical challenges that did not exist in the pre-AI era.

To highlight these issues, a non-limiting example can be considered with reference to the example of an expense management system. In this non-limiting example, an employee of an enterprise purchased a cake for an enterprise event and accesses the expense management system to request reimbursement. The expense management system can leverage a ML model to process an image of the receipt to categorize the expense. However, the ML model incorrectly categorizes the expense as 'External Entertainment,' which is not a reimbursable expense, the correct classification being 'Internal Entertainment.' This inaccuracy can result from the ML model lacking external context (e.g., not being trained on images of receipts for expenditures on cakes as internal expenses). Such inaccuracies lead to longer times in processing expense claims requiring back-and-forths between the employee and administrators, and the like.

In view of the above context, implementations of the present disclosure provide a ML model training system for training ML models. As described in further detail herein, the training system leverages a LLM for knowledge distillation to provide training data and uses multi-task learning to train ML models using the training data. More particularly, the training system of the present disclosure leverages domain-specific prior knowledge captured by an optical character recognition (OCR) model and a classification model, performs self-supervised alignment to distill knowledge from the LLM (e.g., GPT-4) to prepare training data to train ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one datastore. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a training system 120 for training ML models that can be used by an enterprise system 122, as described in further detail herein. For example, the training system 120 can train a ML model 124 that is used by the enterprise system 122. With reference to the non-limiting example introduced above, the enterprise system 122 can be an expense management system and the ML model 124 can be an expense classification ML model that processes images and assigns a class from a set of classes (e.g., external entertainment, internal entertainment). As described in further detail herein, the training system 120 leverages a LLM executed by a LLM system 126 to distill knowledge from the LLM and prepare training data to train ML models, such as the ML model 124. For example, the LLM and the LLM system 126 can be provided by a third-party (e.g., GPT-4 provided by OpenAI).

Figure 2:
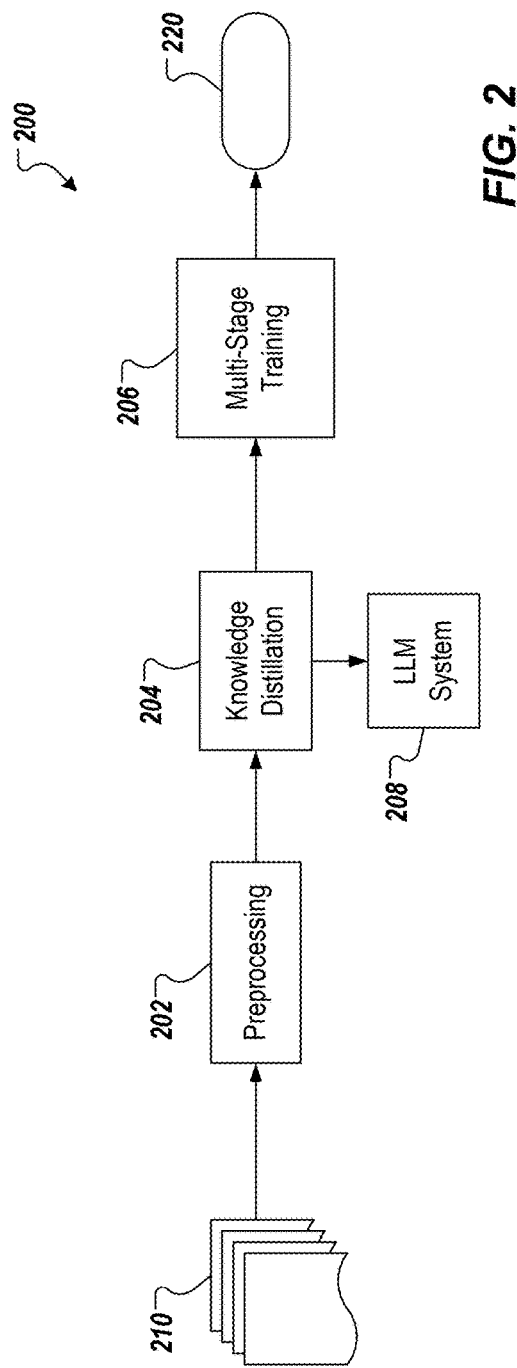
FIG. 2 depicts a conceptual flow in accordance with implementations of the present disclosure.

FIG. 2 depicts an example conceptual architecture 200 in accordance with implementations of the present disclosure. In the depicted example, the example conceptual architecture 200 includes a preprocessing module 202, a knowledge distillation module 204, a multi-stage training module 206, and a LLM system 208. In some examples, the training system of the present disclosure (e.g., the training system 120 of FIG. 1) includes the preprocessing module 202, the knowledge distillation module 204, and the multi-stage training module 206. As described in further detail, the training system processes training data 210 to train a generative ML model 220. After training, the generative ML model 220 can be deployed to an enterprise system (e.g., the enterprise system 122 of FIG. 1) for inference during production use of the enterprise system.

In some implementations, the preprocessing module 202 processes the training data 210 to provide extracted information (e.g., textual information from OCR of the training data). The knowledge distillation module 204 processes the extracted information in a self-supervised knowledge distillation process to generate additional training data. For example, and as described in further detail herein, the additional training data can include summaries of the training data that are generated by the LLM system 208 (e.g., the LLM system 126 of FIG. 1). The multi-stage training module 206 trains the generative ML model 220 using the training data through a multi-stage training process that includes multi-task training and retrieval-augmented generation (RAG) training. In accordance with implementations of the present disclosure, the generative ML model 220 is trained to perform multiple tasks. Example tasks can include, without limitation, classifying documents (classification task) and generating summaries of documents (generation task).

Figure 3:
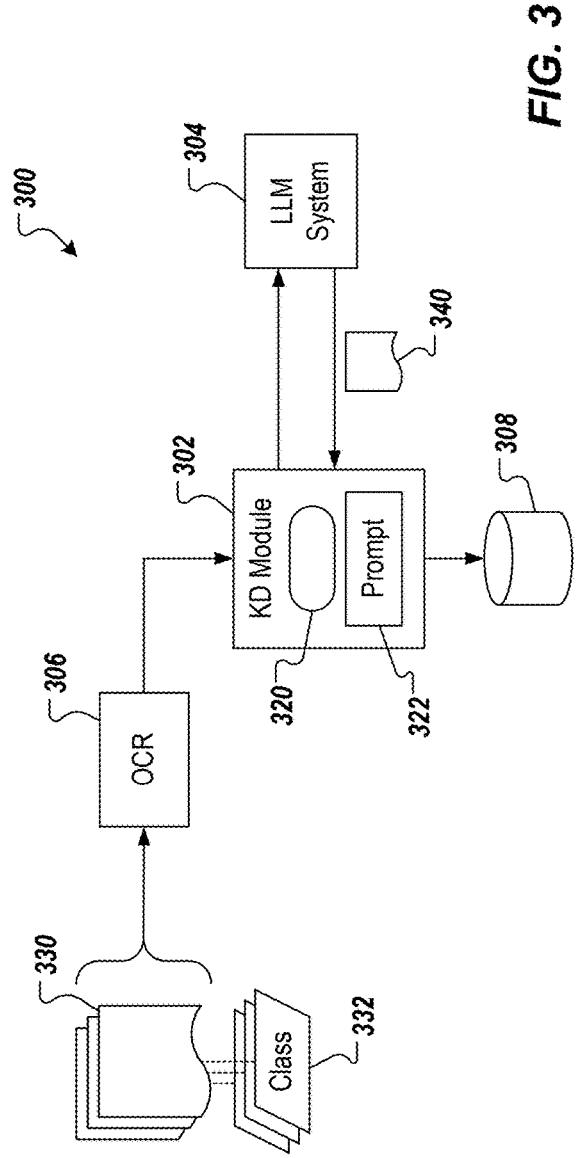
FIG. 3 depicts an example architecture for self-supervised knowledge distillation in accordance with implementations of the present disclosure.

FIG. 3 depicts an example architecture 300 for self-supervised knowledge distillation in accordance with implementations of the present disclosure. The example architecture 300 includes a knowledge distillation (KD) module 302, a LLM system 304 (e.g., the LLM system 126 of FIG. 1), an OCR module 306, and a datastore 308. The KD module 302 executes a ML model 320 for inference to provide predictions and uses a prompt module 322 to selectively prompt the LLM system 304, as described in further detail herein. The ML model 320 is pre-trained (prior to self-supervised knowledge distillation) to perform some task. For example, the ML model 320 can be pre-trained on a corpus of training data that is representative of a task. An example task can include predicting classes of documents and the corpus of training data can include documents with associated classes (e.g., each document is associated with a class label). In some examples, the ML model 320 is trained using the training data in a supervised training process.

For self-supervised knowledge distillation of the present disclosure, a dataset can be used that is different from the training data used to pre-train the ML model 320. For example, the dataset can include documents 330 with associated classes in labels 332, which document-label pairs were not included in the training data. For example, and with reference to the example expense management system introduced above, each document 330 can include an image of a receipt (or invoice) and the ML model 320 is tasked with predicting a class of the documents 330. For example, each document 330 is processed through the OCR module 306, which returns extracted information (e.g., text), and the ML model 320 processes the extracted information to provide a prediction. However, at least some of the documents 330 can record information that was not represented in the training data used to pre-train the ML model 320. As such, it is expected that the ML model 320 will incorrectly predict classes of some of the documents 330.

As described in further detail herein, if a prediction of the ML model 320 is incorrect, the KD module 302 uses a prompt sub-module to prompt the LLM system 304. More particularly, the KD module 302 processes extracted information (from the OCR module 306) of a document 330 through the ML model 320 to generate a prediction and compares the prediction to the label 332 associated with the document 330. If the prediction is correct (e.g., the ML model 320 predicts the correct class), the pair of the document 330 (extracted information) and the label 332 are stored in the datastore 308 for subsequent use during training of a generative ML model, as described in further detail herein.

If the prediction of the ML model 320 is incorrect, the prompt module 322 of the KD module 302 generates a prompt that is used to prompt the LLM system 304. In some examples, the prompt is generated using a prompt template that includes static text (e.g., same text for each prompt that is to be generated) and placeholders. In some examples, the static text defines the task that is to be performed by the LLM system 304 (e.g., generate a summary of the extracted information), can constrain the LLM system 304 (e.g., define a format of the summary, limit a number of tokens in the summary), and other instructions for processing the prompt. In some examples, the prompt is generated by populating placeholders with, for example, the extracted information from the document 330.

---Task Start---
You are an experienced business documentation analyst, please follow a set of specified instructions for a specific documentation:
---Instructions Start--
  (1) (optional) Please take the {context} into consideration to identify the context for the documentation usage. Considering the context or backgrounds in summarizing the documentation
  (2) Carefully review the header fields and lineitems to provide a concise summarization based on {documentation schema}
  (3) Summarize the documentation in one sentence in no more than {token limits} tokens
---Instructions End---
---Document Start---
{document}
---Document End---

Your task is to summarise the given documentation by following the instructions provided above, response with the concise documentation summary only.
Listing 1: Example Prompt In response to the prompt, the LLM system 304 returns a summary 340 of the document 330.

In some implementations, the summary 340 is processed by the ML model 320 to generate a prediction and compares the prediction to the label 332 associated with the document 330. If the prediction is correct (e.g., the ML model 320 predicts the correct class based on the summary 340 provided by the LLM system 304), the summary 340 and the label 332 are stored in the datastore 308 for subsequent use during training of a generative ML model, as described in further detail herein. In some examples, if the summary 340 results in an incorrect prediction of the class, the LLM system 304 is prompted to provide a revised summary (e.g., using another prompt template) and the process is repeated for the revised summary. In some examples, this can be repeated until the ML model 320 provides the correct prediction based on the summary provided by the LLM system 304.

In general, and as described in detail herein, OCR is used to extract information from each document into respective textual representations and a documentation classification model (e.g., the ML model 320) predicts a label (Label_original) for each of the documents using the respective textual representations. The LLM is used to summarize each of the documents as summaries provided in text format. The summaries are used to provide predicted labels (Label_summary). In some examples, if, for a given document, Label_original is the same as Label_summary, the document, summary, and label are used for generation and classification tasks. If Label_original is not the same as Label_summary, the document and label are used for the classification task.

After the self-supervised knowledge distillation is complete, a generative ML model, denoted as θ, is trained in a multi-stage training process that includes multi-task training and RAG training. In some examples, the generative ML model is a transformer encoder-decoder model that includes an encoder that processes input text and a decoder that generates output text. An example transformer encoder-decoder model can include, but is not limited to, a Text-to-Text Transfer Transformer (T5). As described herein, the generative ML model is trained to support both document summarization and document classification tasks in an end-to-end manner. During training, a document embedding is defined as the final layer hidden state of a classify (CLS) token, which can be described as a token that represents the entire input sequence and is placed at the beginning of the input. In the context of the present disclosure, the input sequence can include the extracted information or the summary. For example, and as discussed above, the datastore 308 of FIG. 3 can store extracted information and labels 332 for documents 330 that the ML model 320 predicted correctly and can store summaries 340 and labels 332 for documents 330 that the ML model 320 predicted incorrectly.

During multi-task training, the input sequence (extracted information) is denoted as x and the desired outputs are document type, denoted as c and the LLM-generated summarization, denoted as γ. In some examples, an equal loss weight is applied to joint train the generative ML model with a generative loss $L_{gen}$ and classification loss $L_{cls}$. The respective loss functions can be provided as:

$$L_{gen} = -\sum_{j=1}^{N} \log p(y_j | x, y_1, \ldots, y_{j-1}; \theta)$$

$$L_{cls} = -\log p(c|x; \theta)$$

A total loss can be determined as a weighted sum of generative loss $L_{gen}$ and classification loss $L_{cls}$. The generative ML model is trained over multiple iterations (epochs) to collectively minimize the total loss. For each iteration, the output of the generative ML model is compared to expected output and the total loss is determined. If the total loss satisfies one or more conditions (e.g., meets a minimum loss), training ends. If the total loss does not satisfy the one or more conditions, parameters of the generative ML model are adjusted and another iteration of training is performed.

Figure 4:
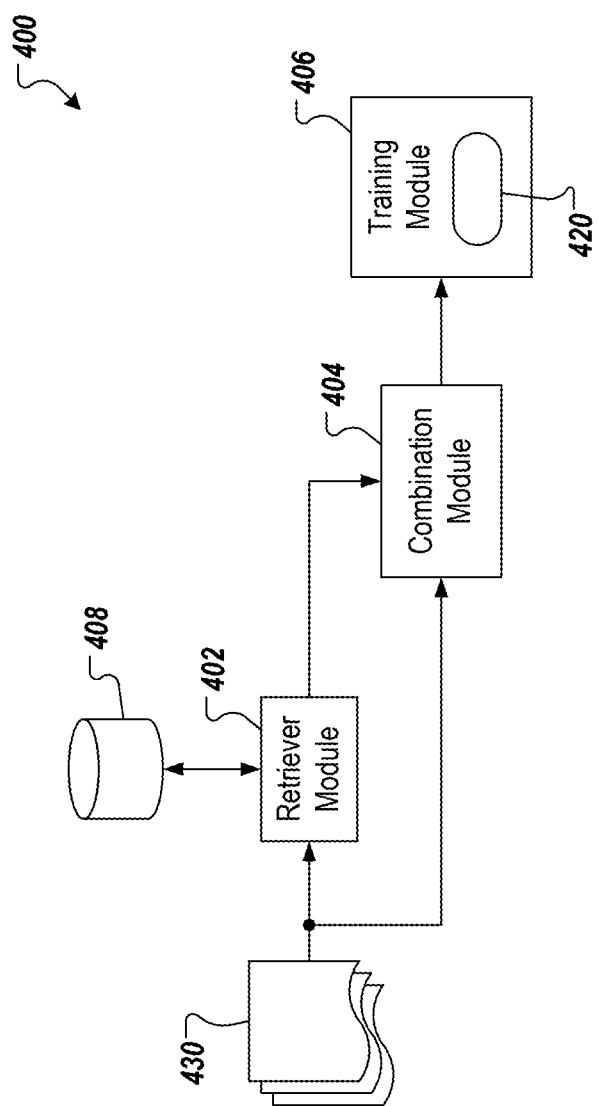
FIG. 4 depicts an example architecture for training of a ML model in accordance with implementations of the present disclosure.

After the multi-task training is complete, the generative ML model is considered partially trained. The generative ML model is further trained using RAG training. FIG. 4 depicts an example architecture 400 for RAG training of the generative ML model. The example architecture 400 includes a retriever module 402, a combination module 404, a training module 406, and a datastore 408. In some examples, the training module 406 executes training of a generative ML model 420. For example, the generative ML model 420 can be pre-trained through the multi-task training (e.g., as described above) and is further trained through RAG training by the training module 406.

More particularly, the generative ML model 420 is trained using training data 430 that is provided from the self-supervised knowledge distillation. For example, the training data 430 can be provided from the datastore 308 of FIG. 3 and can include, for each document 330 of FIG. 3, extracted information (from OCR), summary (from LLM), and class (assigned label). Further, the generative ML model 420 using context data provided from documents stored in the datastore 408, which can be representative of documents that are to be used as context for the generative ML model 420. For example, the datastore 408 can store extracted information from documents (e.g., extracted using OCR) that are historical documents of the enterprise (e.g., historical receipts that had been processed by the expense management system of the enterprise).

In some implementations, the retriever module 402 retrieves documents from the datastore 408 that are determined to be relevant to a sample of the training data 430. Here, a sample of the training data 430 can include a tuple [extracted information, summary, class] of a respective document (e.g., a document 330 of FIG. 3). In some examples, the retriever module 402 uses lexical-based retrieval and semantic-based retrieval.

With regard to lexical-based retrieval, which can be considered sparse, documents can be compared to a search query to determine lexical similarity to the search query. In some examples, a lexical-based retriever is used to determine lexical similarity between documents and the search query. In the context of the present disclosure, the search query can include a sample of the training data and the documents can include documents stored in the datastore 408. For example, a sample including [extracted information, summary, class], or a portion thereof (e.g., extracted information and/or summary) can be compared to documents to by the lexical-based retriever to identify lexically similar documents.

An example lexical-based retriever can include, without limitation, a best matching (BM) retriever, such as a BM25 retriever, that can be described as using a bag-of-words retrieval function that ranks a set of documents based on the terms of the search query appearing in each document. More particularly, BM25 extends term frequency inverse document frequency (TF-IDF) by considering term frequency saturation and document length to rank documents based on query term occurrence and rarity across the corpus of documents (e.g., the data stored in the datastore 408). The following example relationship can be provided for lexical-based similarity ($s_{lex}$):

$$s_{lex,i,j} = BM25(X_i, D_j)$$

where $X_i$ is the extracted information of the $i^{th}$ sample of the training data 430 and $D_j$ is the extracted information of the $j^{th}$ document in the datastore 408.

With regard to semantic-based retrieval, which can be considered dense, a dense passage retrieval (DPR) retriever can be used. In some examples, given a collection of documents, the DPR indexes all of the documents in a low-dimensional and continuous space, such that the DPR retriever can retrieve documents relevant to an input. In the context of the present disclosure, the input can include a summary generated by the LLM system and the documents can include extracted information (by OCR) from documents in the datastore 408. The following example relationship can be provided for semantic-based similarity ($s_{sem}$):

$$s_{sem,i,j} = sim(D_j, S_i) = [CLS_{D_j}]^T [CLS_{S_i}]$$

where $S_i$ is the summary (LLM-generated) of the $i^{th}$ sample of the training data 430 and $D_j$ is the extracted information of the $j^{th}$ document in the datastore 408. This can be described as a dense semantic presentation similarity measurement.

In some examples, the DPR retriever is provided as an encoder that is trained in parallel with training of the generative ML model 420 during the RAG training. For training, the DPR retriever is initialized as the encoder of the ML model 420, which has already been trained (during multi-task training). That is, a copy of the encoder of the generative ML model 420 is used as the DPR retriever. For training of the DPR retriever, in-batch negatives are leveraged to optimize the loss. In some examples, the loss ($\mathcal{L}_{nce}$) can be provided as a contrastive loss, such as InfoNCE loss, represented in the following example relationship:

$$\mathcal{L}_{nce} = \frac{1}{N} \sum_{i=1}^{N} -\log \frac{\exp(sim(D_i, S_i))}{\exp(sim(D_i, S_i)) + \sum_{j \in M, j \neq i} \exp(sim(D_i, S_j))}$$

where M is a current mini-batch and N denotes the number of positive training examples in the mini-batch. Accordingly, across iterations of training of the generative ML model 420, parameters of the DPR retriever are also adjusted to optimize the loss ($\mathcal{L}_{nce}$).

In some implementations, the retriever module 402 combines the lexical-based and semantic-based similarities to provide a hybrid similarity as:

$$s_{hyb,i,j} = s_{sem,i,j} + \lambda s_{lex,i,j}$$

where $\lambda$ is a configurable weight to weight the lexical similarity relative to the semantic similarity.

During iterations of training of the generative ML model 420, samples of the training data 430 are processed to determine a similar document from the datastore 408. More particularly, for each sample i of the training data 430, a set of hybrid similarity scores $\{s_{hyb,i,1}, \ldots, s_{hyb,i,p}\}$ is determined, where p is the number of documents stored in the datastore 408. A maximum hybrid similarity score is determined (e.g., MAX($s_{hyb,i,1}, \ldots, s_{hyb,i,p}$)). The document of the datastore 408 that corresponds to the maximum hybrid similarity score is selected as most similar to the sample i of training data 430 and is used to provide an augmented input to the generative ML model 420. More particularly, the combination module 404 combines the sample i of the training data 430 with the most similar document to provide the augmented input. The following example relationship can be provided:

$$\hat{X}_i = X_i \oplus D_{sim} \oplus C_{sim}$$

where $\hat{X}_i$ is the augmented input, $X_i$ is the extracted information (OCR text) of the sample i of the training data 430, and $D_{sim}$ is the extracted information (OCR text) from and $C_{sim}$ is the class assigned to the document that is determined to be most similar to the sample i of the training data 430.

$$\hat{X}_i = [CLS] X_i [R\_DOC] D_j [R\_DOC\_TYPE] C_j$$

where [CLS] is a global representation for classification, $X_i$ is original the input documentation, [R_DOC] is a special token (separator) indicating the start of retrieved document, $D_j$ is the top-ranked retrieved document (or retrieved document summarization), [R_DOC_TYPE] is a special token (separator) that indicates the start of retrieved document type, $C_j$ is the corresponding document type (class) of the retrieved document.

During training, multiple $\hat{X}_i$ (for multiple samples i of the training data 430) are input to the generative ML model 420, which returns a class and a summary for each, which are used to determine loss. In some examples, for training of the generative ML model 420 negative log-likelihood loss is used with a goal of minimizing the loss of iterations of training. If, after an iteration of training, the loss does not meet one or more conditions, another iteration of training can be performed with parameters of the generative ML model 420 and parameters of the DPR retriever being adjusted relative to a previous iteration.

Once the loss is minimized, training is complete and the generative ML model can be deployed with an enterprise system for inference during production use of the enterprise system. For example, and with reference to the expense management system, the generative ML model can process input (e.g., OCR text extracted from documents) to assign classes and provide summaries of documents. In this manner, users of the expense management system not only are informed of the class (e.g., internal expense), but are also provided a level of reasoning for the class as represented in the summary.

Figure 5:
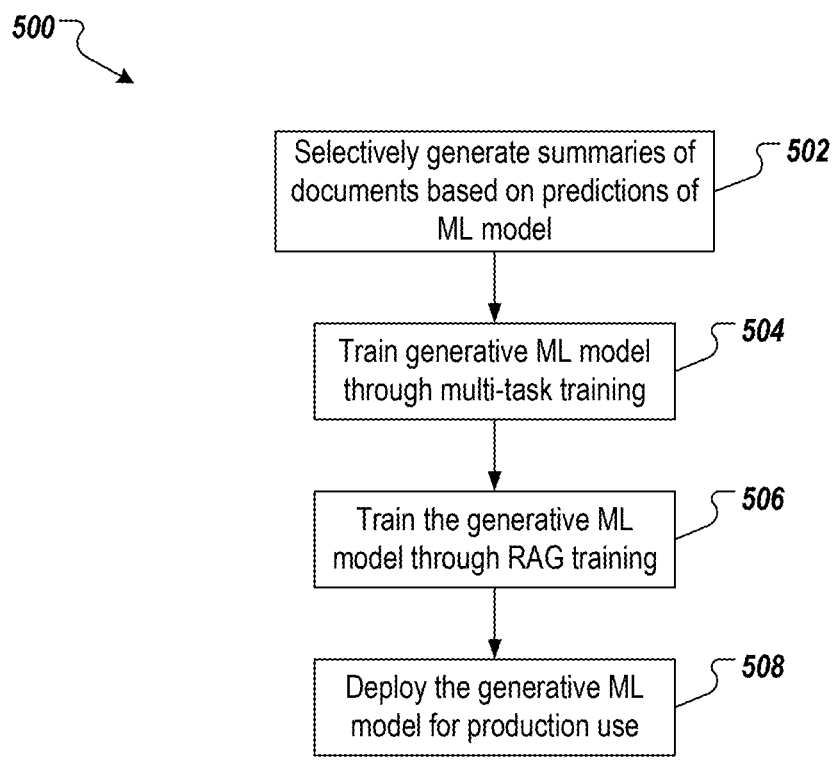
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A set of documents is processed using a pretrained ML model to selectively use a LLM to generate summaries for documents in the set of documents (502). For example, and as described herein with reference to FIG. 3, during self-supervised knowledge distillation, the ML model 320 is used to predict classes of documents 330 based on extracted information (OCR text) of the documents 330. If a prediction of the ML model 320 is incorrect, the KD module 302 uses a prompt sub-module to prompt the LLM system 304, which returns a summary of a respective document. The ML model 320 processes the summary to predict a class and, if the class is correct, the summary is added to training data (e.g., stored in the datastore 308, such as the training data 430 of FIG. 4). If the class is incorrect, the LLM system 304 is prompted to revise the summary until the class predicted by the ML model 320 is correct.

A generative ML model is trained through a multi-task training (504). For example, and as described herein, the ML model 420 is trained through multi-task training where, for each sample of training data, the generative ML model 420 is executed to provide a predicted summary and a predicted class, predicted summaries and predicted classes being used to determine a total loss that is minimized across iterations of the multi-task training. In some examples, the total loss is based on a generative loss and a class loss. The generative ML model is trained through a RAG training using the training data (506). For example, and as described herein, during RAG training and for each sample of the training data 430, a historical document is determined as a most similar document to a respective sample of the training data from a set of historical documents, an augmented input is provided based on the respective sample and the historical document, and the generative ML model is executed to provide a generated summary and class in response to the augmented input, generated summaries and classes being used to determine a loss (e.g., negative log-likelihood loss) that is minimized across iterations of the RAG training.

The generative ML model is deployed for use with an enterprise system (508). For example, and as described herein, the generative ML model can be hosted within a network and can be accessed by the enterprise system. For example, input to the enterprise system (e.g., a document) can be processed to provide extracted information (OCR text) that is processed by the generative ML model to return a class and a summary. The enterprise system can further process the document based on the class and the summary.

Figure 6:
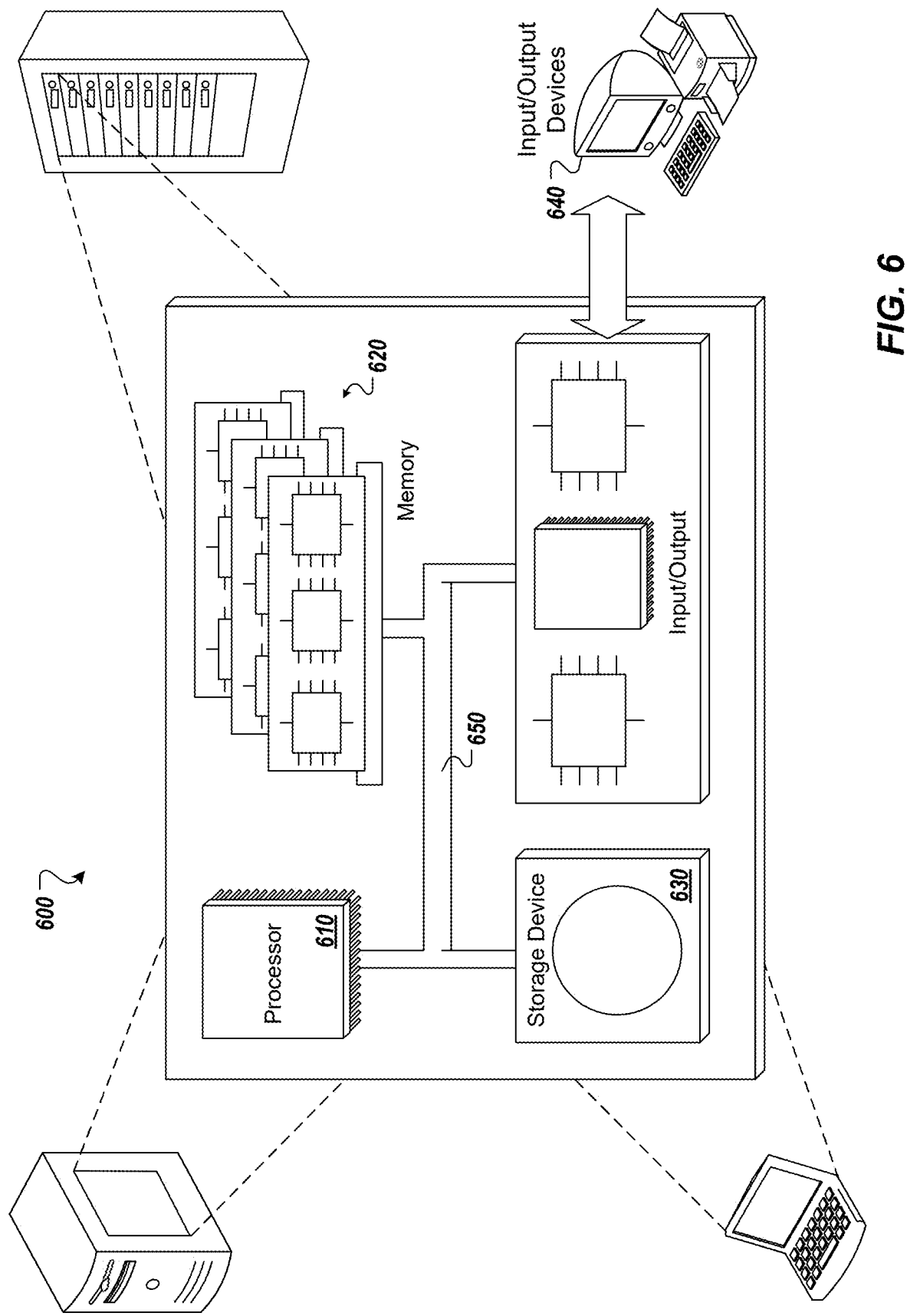
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for provisioning of generative machine learning (ML) models for enterprise systems, the method being executed by one or more processors and comprising:
processing a set of documents using a pretrained ML model to selectively use a large language model (LLM) to generate summaries for documents in the set of documents;
training a generative ML model through a multi-task training using training data comprising the summaries, the multi-task training comprising, for each sample of the training data, executing the generative ML model to provide a predicted summary and a predicted class, predicted summaries and predicted classes being used to determine a total loss that is minimized across iterations of the multi-task training;
training the generative ML model through a retrieval-augmented generation (RAG) training using the training data, the RAG training comprising, for each sample of the training data:
determining a historical document as a most similar document to a respective sample of the training data from a set of historical documents,
providing an augmented input based on the respective sample and the historical document, and
executing the generative ML model to provide a generated summary and class in response to the augmented input, generated summaries and classes being used to determine a loss that is minimized across iterations of the RAG training; and
after training, using the generative ML model with an enterprise system.

2. The method of claim 1, wherein processing a set of documents using a pretrained ML model to selectively use a LLM to generate summaries for documents in the set of documents comprises:
prompting the LLM to generate a summary based on a document in the set of documents;
processing the summary through the pretrained model to predict a class; and
in response to the class matching an expected class, associating the summary with the document in the training data.

3. The method of claim 1, further comprising determining a set of similarity scores, each similarity score representing a degree of similarity between the respective sample of the training data and a respective historical document, each similarity score comprising a lexical similarity score and a semantic similarity score.

4. The method of claim 3, wherein the lexical similarity score is determined using a best matching (BM) retriever and the semantic similarity score is determined using a dense passage retrieval (DPR) retriever.

5. The method of claim 1, wherein determining a historical document as a most similar document to a respective sample of the training data from a set of historical documents is at least partially executed using a retriever that is trained during the RAG training.

6. The method of claim 5, wherein, at starting the RAG training, the retriever is initialized as an encoder of the generative ML model, the encoder being trained during the multi-task training.

7. The method of claim 1, further comprising, for each document in the set of documents, preprocessing the document to provided extracted information, the extracted information being used for the multi-task training and the RAG training.

8. A non-transitory computer-readable storage medium coupled to one or more processors and having instructions stored thereon which, when executed by the one or more processors, cause the one or more processors to perform operations for provisioning of generative machine learning (ML) models for enterprise systems, the operations comprising:
processing a set of documents using a pretrained ML model to selectively use a large language model (LLM) to generate summaries for documents in the set of documents;
training a generative ML model through a multi-task training using training data comprising the summaries, the multi-task training comprising, for each sample of the training data, executing the generative ML model to provide a predicted summary and a predicted class, predicted summaries and predicted classes being used to determine a total loss that is minimized across iterations of the multi-task training;
training the generative ML model through a retrieval-augmented generation (RAG) training using the training data, the RAG training comprising, for each sample of the training data:
determining a historical document as a most similar document to a respective sample of the training data from a set of historical documents,
providing an augmented input based on the respective sample and the historical document, and
executing the generative ML model to provide a generated summary and class in response to the augmented input, generated summaries and classes being used to determine a loss that is minimized across iterations of the RAG training; and
after training, using the generative ML model with an enterprise system.

9. The non-transitory computer-readable storage medium of claim 8, wherein processing a set of documents using a pretrained ML model to selectively use a LLM to generate summaries for documents in the set of documents comprises:
prompting the LLM to generate a summary based on a document in the set of documents;
processing the summary through the pretrained model to predict a class; and
in response to the class matching an expected class, associating the summary with the document in the training data.

10. The non-transitory computer-readable storage medium of claim 8, wherein operations further comprise determining a set of similarity scores, each similarity score representing a degree of similarity between the respective sample of the training data and a respective historical document, each similarity score comprising a lexical similarity score and a semantic similarity score.

11. The non-transitory computer-readable storage medium of claim 10, wherein the lexical similarity score is determined using a best matching (BM) retriever and the semantic similarity score is determined using a dense passage retrieval (DPR) retriever.

12. The non-transitory computer-readable storage medium of claim 8, wherein determining a historical document as a most similar document to a respective sample of the training data from a set of historical documents is at least partially executed using a retriever that is trained during the RAG training.

13. The non-transitory computer-readable storage medium of claim 12, wherein, at starting the RAG training, the retriever is initialized as an encoder of the generative ML model, the encoder being trained during the multi-task training.

14. The non-transitory computer-readable storage medium of claim 8, wherein operations further comprise, for each document in the set of documents, preprocessing the document to provided extracted information, the extracted information being used for the multi-task training and the RAG training.

15. A system, comprising:
a computing device; and
a computer-readable storage device coupled to the computing device and having instructions stored thereon which, when executed by the computing device, cause the computing device to perform operations for provisioning of generative machine learning (ML) models for enterprise systems, the operations comprising:
processing a set of documents using a pretrained ML model to selectively use a large language model (LLM) to generate summaries for documents in the set of documents;
training a generative ML model through a multi-task training using training data comprising the summaries, the multi-task training comprising, for each sample of the training data, executing the generative ML model to provide a predicted summary and a predicted class, predicted summaries and predicted classes being used to determine a total loss that is minimized across iterations of the multi-task training;
training the generative ML model through a retrieval-augmented generation (RAG) training using the training data, the RAG training comprising, for each sample of the training data:
determining a historical document as a most similar document to a respective sample of the training data from a set of historical documents,
providing an augmented input based on the respective sample and the historical document, and
executing the generative ML model to provide a generated summary and class in response to the augmented input, generated summaries and classes being used to determine a loss that is minimized across iterations of the RAG training; and
after training, using the generative ML model with an enterprise system.

16. The system of claim 15, wherein processing a set of documents using a pretrained ML model to selectively use a LLM to generate summaries for documents in the set of documents comprises:
prompting the LLM to generate a summary based on a document in the set of documents;
processing the summary through the pretrained model to predict a class; and
in response to the class matching an expected class, associating the summary with the document in the training data.

17. The system of claim 15, wherein operations further comprise determining a set of similarity scores, each similarity score representing a degree of similarity between the respective sample of the training data and a respective historical document, each similarity score comprising a lexical similarity score and a semantic similarity score.

18. The system of claim 17, wherein the lexical similarity score is determined using a best matching (BM) retriever and the semantic similarity score is determined using a dense passage retrieval (DPR) retriever.

19. The system of claim 15, wherein determining a historical document as a most similar document to a respective sample of the training data from a set of historical documents is at least partially executed using a retriever that is trained during the RAG training.

20. The system of claim 19, wherein, at starting the RAG training, the retriever is initialized as an encoder of the generative ML model, the encoder being trained during the multi-task training.

* * * * *